US009606541B2

(12) United States Patent
Abramson

(10) Patent No.: US 9,606,541 B2
(45) Date of Patent: Mar. 28, 2017

(54) ROBOT DOCKING STATION AND ROBOT FOR USE THEREWITH

(75) Inventor: Shai Abramson, Har-Halutz (IL)

(73) Assignee: F Robotics Acquisitions Ltd., Pardesia (IL)

(*) Notice: Subject to any disclaimer, the term of this patent is extended or adjusted under 35 U.S.C. 154(b) by 413 days.

(21) Appl. No.: 12/788,489

(22) Filed: May 27, 2010

(65) Prior Publication Data

US 2011/0130875 A1 Jun. 2, 2011

Related U.S. Application Data

(62) Division of application No. 10/588,179, filed as application No. PCT/IL2005/000119 on Feb. 2, 2005, now Pat. No. 7,729,801.

(Continued)

(51) Int. Cl.
*B25J 9/00* (2006.01)
*B25J 5/00* (2006.01)
(Continued)

(52) U.S. Cl.
CPC ......... *G05D 1/0265* (2013.01); *A01D 34/008* (2013.01); *A47L 9/009* (2013.01); *A47L 9/2805* (2013.01); *A47L 9/2852* (2013.01); *A47L 9/2873* (2013.01); *A47L 9/2884* (2013.01); *A47L 9/2894* (2013.01); *G05D 1/0225* (2013.01); *H01R 13/6315* (2013.01); *A47L 2201/00* (2013.01); *A47L 2201/022* (2013.01);
(Continued)

(58) Field of Classification Search
CPC ............................. C08L 71/12; C08L 2666/02

USPC .......... 414/331.07; 320/109; 318/587, 568.1; 700/245
See application file for complete search history.

(56) References Cited

U.S. PATENT DOCUMENTS

| 4,860,975 A | 8/1989 | Schliesing et al. |
| 5,440,216 A * | 8/1995 | Kim .............................. 318/587 |

(Continued)

FOREIGN PATENT DOCUMENTS

| EP | 1302147 B1 | 4/2003 |
| EP | 1430826 A2 | 6/2004 |

(Continued)

OTHER PUBLICATIONS

European Examination Report issued in related European Patent Application Serial No. 05703162.7 dated Sep. 26, 2008, 5 pages.

(Continued)

*Primary Examiner* — John Q Nguyen
*Assistant Examiner* — Rodney P King
(74) *Attorney, Agent, or Firm* — Gerry J. Elman; Elman Technology Law, P.C.

(57) ABSTRACT

A docking station (20) and a robot (22) for docking therein, include corresponding transmission parts. These transmission parts are for the transmission of energy, such as electricity, for recharging the robot (22), and/or signals, for operating the robot (22), the energy and/or signals passing between the docking station and the robot (22). The docking station (20) and robot (22) are such that the docking of the robot (22) in the docking station (20) is at a horizontal orientation, as the transmission part on the robot (22) includes laterally protruding docking contacts that contact corresponding laterally oriented contact arms of the docking station (20).

30 Claims, 10 Drawing Sheets

Related U.S. Application Data

(60) Provisional application No. 60/541,296, filed on Feb. 3, 2004.

(51) Int. Cl.
    *G05D 1/02*      (2006.01)
    *A01D 34/00*     (2006.01)
    *A47L 9/00*      (2006.01)
    *A47L 9/28*      (2006.01)
    *H01R 13/631*    (2006.01)

(52) U.S. Cl.
    CPC .......... *G05D 1/028* (2013.01); *G05D 1/0234* (2013.01); *G05D 2201/0208* (2013.01); *G05D 2201/0215* (2013.01)

(56) References Cited

U.S. PATENT DOCUMENTS

| | | | |
|---|---|---|---|
| 5,598,084 A | 1/1997 | Keith | |
| 5,703,450 A | 12/1997 | Josephs | |
| 6,338,013 B1 | 1/2002 | Ruffner | |
| 6,443,509 B1 | 9/2002 | Levin et al. | |
| 6,493,613 B2 | 12/2002 | Peless et al. | |
| 6,498,454 B1 | 12/2002 | Pinlam et al. | |
| 6,525,509 B1* | 2/2003 | Petersson et al. | 320/107 |
| 6,615,108 B1 | 9/2003 | Peless et al. | |
| 6,764,373 B1 | 7/2004 | Osawa et al. | |
| 7,474,072 B1 | 1/2009 | Parnell | |
| 2001/0045904 A1* | 11/2001 | Silzer, Jr. | 342/357.07 |
| 2002/0013641 A1 | 1/2002 | Nourbakhsh et al. | |
| 2003/0043554 A1* | 3/2003 | Seymour | 361/760 |
| 2003/0094922 A1* | 5/2003 | Petersson et al. | 320/109 |
| 2003/0165373 A1* | 9/2003 | Felder et al. | 414/331.07 |
| 2004/0178767 A1 | 9/2004 | Jeon et al. | |
| 2004/0193339 A1* | 9/2004 | Hulden | G05D 1/0272 701/23 |
| 2005/0010330 A1 | 1/2005 | Abramson et al. | |
| 2005/0041839 A1 | 2/2005 | Saitou et al. | |
| 2005/0150074 A1 | 7/2005 | Diehl et al. | |
| 2007/0267998 A1 | 11/2007 | Cohen et al. | |

FOREIGN PATENT DOCUMENTS

| | | |
|---|---|---|
| FR | 2324047 A1 | 4/1977 |
| GB | 2278937 A | 12/1994 |
| GB | 2394796 A | 5/2004 |

OTHER PUBLICATIONS

Supplementary European Search Report issued in related European Patent Application Serial No. 05703162.7 dated Jan. 21, 2008, 6 pages.

Partial European Search Report dated May 20, 2009, 4 pages.

European Search Report dated Jul. 22, 2009, 10 pages.

* cited by examiner

ROBOT DOCKING STATION AND ROBOT FOR USE THEREWITH

CROSS REFERENCES TO RELATED APPLICATIONS

This application is a divisional application of commonly owned U.S. patent application Ser. No. 10/588,179, entitled: ROBOT DOCKING STATION AND ROBOT FOR USE THEREWITH, filed Aug. 2, 2006, now U.S. Pat. No. 7,729,801, which is 371 of PCT/IL05/00119, entitled: ROBOT DOCKING STATION AND ROBOT FOR USE THEREWITH, filed on Feb. 2, 2005, which claims priority from and is related to U.S. Provisional Patent Application Ser. No. 60/541,296, entitled: ROBOT DOCKING STATION AND ROBOT FOR USE THEREWITH, filed on Feb. 3, 2004. U.S. patent application Ser. No. 10/588,179, PCT/IL05/00119, and U.S. Provisional Patent Application Ser. No. 60/541,296 are incorporated by reference herein.

TECHNICAL FIELD

The present invention is directed to robotics. In particular, the present invention is directed to docking stations for robots that are of use outdoors, and for robots for use with these docking stations, such as robots that function as lawn mowers.

BACKGROUND

Autonomous machines and devices, such as autonomous robots, have been designed for performing various industrial and domestic functions. These domestic functions include lawn mowing, vacuum cleaning, floor sweeping and maintenance. By extending robots to these domestic functions, the person or user employing these robots has increased free or leisure time, as they do not have to expend the time required to perform the aforementioned tasks manually.

These autonomous robots typically operate in accordance with various computer programs that are part of the operating systems. Additionally, many of these autonomous robots are battery powered, and need to be charged once they are out of battery power. Additionally, if out of battery power, these autonomous robots typically stop where the power ran out and may be troublesome to locate or in difficult places to reach.

As a result, the autonomous robot must be located and manually brought to the charging unit, typically an electrical outlet. These processes require the user taking the time to perform them. Additional time is wasted as the user typically must wait a few hours before the robot is recharged, so it can start fresh again with fully charged batteries.

SUMMARY

The present invention provides a docking station for a robot, such as a robotic lawnmower. The docking station is particularly suited for outdoor use, but can also be used indoors, with robots suitably modified for indoor use, if desired.

The docking station and a robot for use therewith, include corresponding transmission parts. These transmission parts, docking contacts on the robot, and contact arms of a contact member on the docking station, facilitate the transmission of energy, such as electricity, for recharging the robot, and/or signals, for operating the robot, through the docking station and the robot, and vice versa. The docking station and robot are such that the docking of the robot in the docking station is at a horizontal orientation, as the transmission part on the robot includes laterally protruding docking contacts, that contact corresponding laterally oriented contact arms of the docking station.

An embodiment of the invention is directed to a robot. The robot includes a movement system for moving the robot over a surface, at least one magnetic contact, for example, two magnetic contacts, extending from the robot (typically laterally, whereby the contacts are at least substantially parallel to the horizontal or ground surface), a control system in communication with the at least one magnetic contact, and, a power supply for the robot, the power supply in communication with the control system and the at least one magnetic contact. The control system is configured for permitting charging of the power supply through the at least one magnetic contact when a predetermined voltage on the at least one contact is detected.

Another embodiment of the invention is directed to a robot, that has a movement system for moving the robot over a surface. The robot also includes at least one contact, typically two contacts, for electrical communication with a transmission part, the at least one contact extending laterally from the robot, and there is a power supply for the robot, the power supply in communication with the at least one contact.

Another embodiment of the invention is directed to a docking station. The docking station includes a portion configured for receiving a robot, a receptor mechanism coupled to the robot receiving portion for receiving at least one docking contact, typically two docking contacts, of the robot, and, a system for providing energy to the robot for charging at least one power supply of the robot, the system coupled to the receptor mechanism. The receptor mechanism is designed for contacting the at least one docking contact of the robot in a substantially horizontal orientation and transmitting energy therethrough.

Another embodiment of the invention is also directed to a docking station. The docking station includes a portion configured for receiving a robot, a receptor mechanism coupled to the robot receiving portion, and, a controller for coupling with at least one tap of an irrigation system. The controller is coupled to the receptor mechanism, and the receptor mechanism is designed for being in at least electrical contact with at least one docking contact, and typically two docking contacts, of the robot, when the robot is docked in the docking station. Also, the controller is configured for sending a signal to a robot docked in the docking station, through the receptor mechanism and the at least one docking contact, for initiating operation of the robot.

Another embodiment of the invention is directed to a docking system. The system includes, a docking station and a robot, for docking therein. The docking station is for being located on a surface, and is designed for accommodating a robot in at least a docking engagement, the docking station including a first transmission part, for example, contact arms on a contact unit, for at least transferring energy. The robot is designed for movement over the surface, the robot including a movement system and a second transmission part. The second transmission part is, for example, formed of two docking contacts, and is designed for at least receiving energy from the first transmission part, when the first transmission part is in electrical contact with the second transmission part, when the robot is docked in the docking station, and the docking is achieved when the first transmission part and the second transmission part are in at least a substantially horizontal alignment.

Another embodiment of the invention is also directed to a docking system. The docking system includes a docking station and a robot for docking therein. The docking station is designed for location on a surface, and accommodating a robot in at least a docking engagement. The docking station includes a first transmission part, for example, contact arms on a contact member, for at least facilitating the transmission and reception of signals. The robot is designed for movement over the surface, the robot including a movement system and a second transmission part. The second transmission part typically includes two docking contacts on the robot, and is designed for at least facilitating the transmission and reception of signals to and from the first transmission part, when the first transmission part is in electrical contact with the second transmission part, when the robot is docked in the docking station, and the docking is achieved when the first transmission part and the second transmission part are in at least a substantially horizontal alignment.

Another embodiment of the invention is directed to a method for docking a robot in a docking station. The method includes the robot responding to a signal in a wire defining a boundary, moving to the docking station by traveling along at least a portion of the wire, attempting to dock in the docking station by a first transmission part on the docking station being electrically contacted by a second transmission part on the robot, and, determining if the electrical contact is at a predetermined level. If the electrical contact is at least at a predetermined level, energy is transmitted from the docking station to the robot, through the first and second transmission parts. This energy transmitted includes electricity from the docking station to a power supply of the robot, to charge the power supply, through the electrical contact of the first and second transmission parts. If the electrical contact is not at the predetermined level or an electrical contact is not made, the robot is moved out of the docking station. The robot then attempts to redock in the docking station.

Another embodiment of the invention is directed to a robot. The robot includes a movement system for moving the robot over a surface and at least one contact, typically two contacts, for communicating with a transmission part, for example, contact arms of a contact unit, of a docking station. The at least one contact is magnetic and extends laterally from the robot, typically in an orientation at least substantially parallel to the horizontal or ground surface. The at least one contact facilitates communication with the at least one transmission part when the movement system moves the robot into a position for docking, and for maintaining the position of the robot in the docking station.

BRIEF DESCRIPTION OF THE DRAWINGS

Attention is now directed to the drawings, where like numerals and/or characters indicate corresponding or like components. In the Drawings.

DETAILED DESCRIPTION

Figure 1:
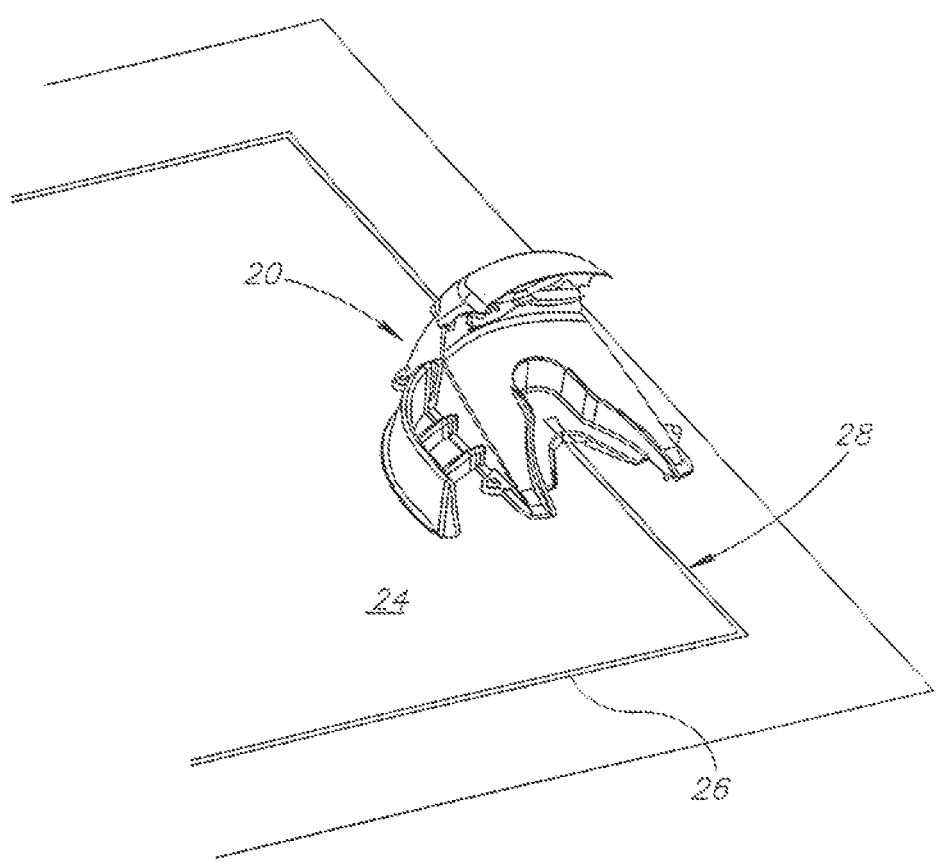
FIG. 1 is a perspective view showing an embodiment of the docking station of the invention in an exemplary operation.

Turning to FIG. 1, there is shown a docking station 20 for receiving a robot, such as a robotic lawnmower 22 (FIGS. 7-14) (robot and robotic lawnmower are used interchangeably in this document, with a robotic lawnmower being one type of robot or autonomous machine suitable for use in accordance with the invention). The docking station 20 typically resides in or proximate to a work area 24 (predetermined portion of a ground surface), for example, along a perimeter wire 26 (typically buried in the ground) or other boundary marker (wired or wireless, or combinations thereof).

The perimeter wire 26 defines the boundary 28 of the work area 24 for the robotic lawnmower (or robot) 22. The robot 22 can dock while following the perimeter wire 26, operating in an edge mode, typically by detecting a perimeter signal in the perimeter wire 26, for example, after it has worked the area 24 within the perimeter wire 26. An exemplary edge mode is described in commonly owned U.S. Pat. No. 6,493,613. U.S. Pat. No. 6,493,613 is incorporated by reference herein.

Figure 10:
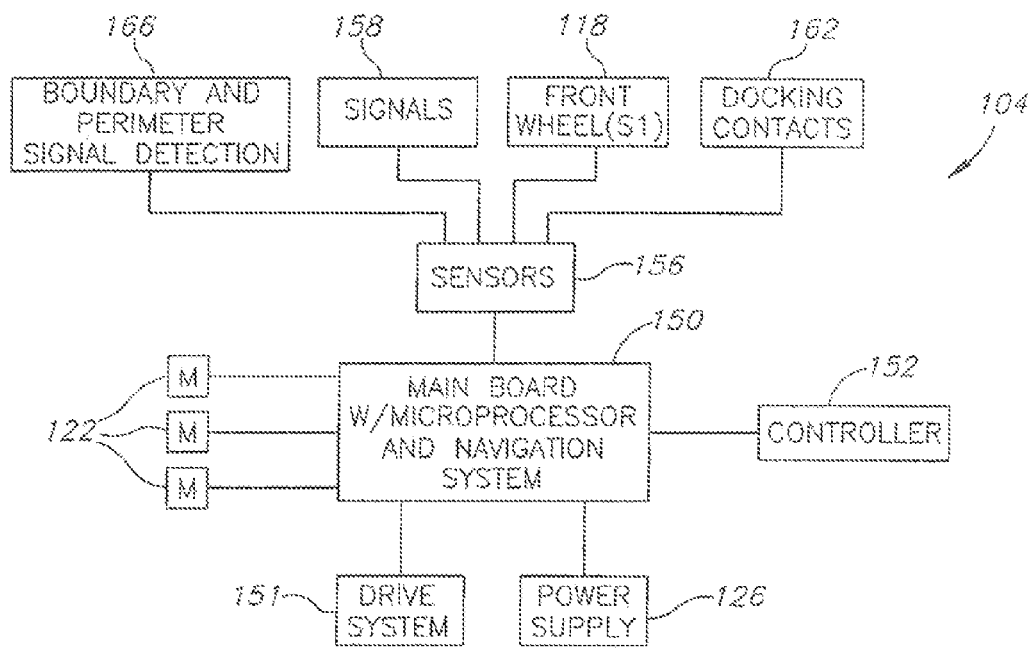
FIG. 10 is a schematic diagram of the control system of the robot.

The perimeter signal is emitted from the docking station 20, through the perimeter wire 26. The perimeter signal is typically a low frequency electromagnetic signal, that induces a magnetic field. According to the strength of the field, at the location where it is initially detected by a boundary and perimeter detection sensor 166 on the robot 22, the control system 104 (as shown in FIG. 10) of the robot 22 can determine the location of the robot 22 with respect to the perimeter wire 26. In particular, the control system 104 can determine whether the robot 22 is inside or outside of the work area 24, and the perimeter wire 26. As detailed below, with the perimeter signal detected at a location in the perimeter wire 26, the navigation 150 and drive 151 systems of the robot 22 can be coordinated in the control system 104, to move the robot 22 into the docking station 20, by traveling along at least a portion of the perimeter wire 26.

Figure 5:
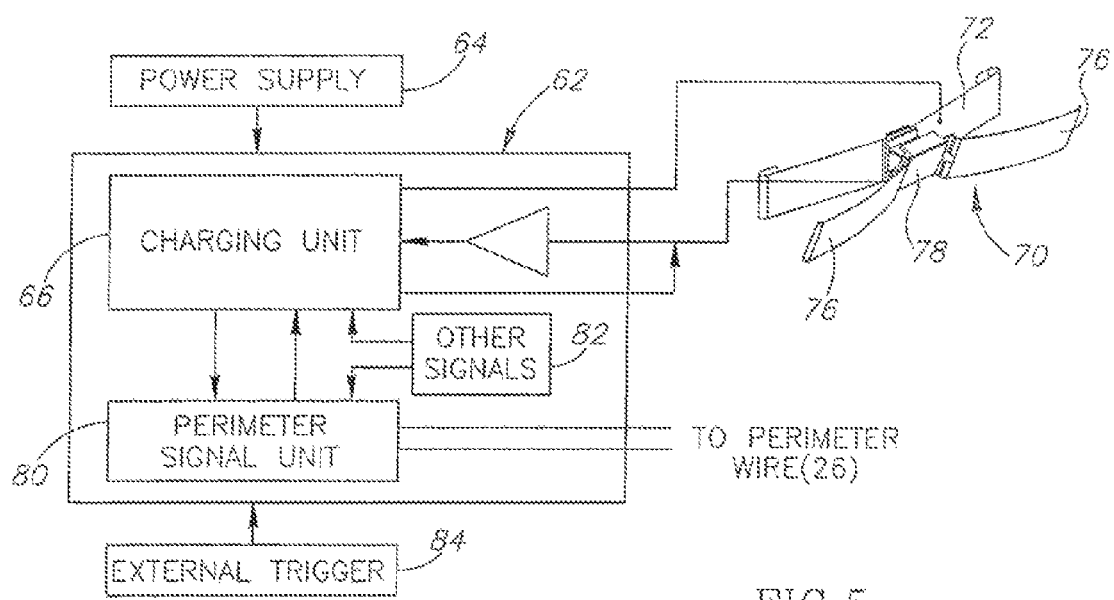
FIG. 5 is a schematic diagram of the control system for the docking station.

The perimeter signal may also be a radio signal, a light signal (infrared or other wavelength signal), or any other signal whose intensity is greatest closest to its transmission source, from a transmitter (perimeter signal unit 80 of FIG. 5) in the docking station 20. In these cases, where the signal is a radio or light signal, the robot 22 would include a receiver for such signals, and its control system 104 would be programmed to coordinate data from the receiver, with its navigation 150 and drive 151 systems, as detailed below, to return to the docking station 20.

The robot 22 (that includes a processor based control system 104, shown in FIG. 10) can also be programmed, by conventional techniques, to move toward the perimeter wire 26 to detect the perimeter signal, when: 1) its operation is complete (the area within the boundary marker 28 has been worked); 2) its battery voltage reaches (drops to) a predetermined threshold; 3) a predetermined time for operation has expired; or 4) a problem in the robot 22 itself is detected. Alternately, the robotic lawnmower 22 maps the boundary 28 by detecting the perimeter wire 26 and the proximity thereto. This mapping and detection is in accordance with commonly owned U.S. Pat. No. 6,255,793, or in accordance with navigation and detection methods disclosed in commonly owned U.S. Pat. No. 6,615,108. U.S. Pat. No. 6,255,793 and U.S. Pat. No. 6,615,108 are incorporated by reference herein. As discussed above, the robot 22 includes a processor based control system 104 (FIG. 10), that can be programmed, by conventional techniques, to detect the position of the perimeter wire 26 during its mapping operation or upon its initial placement relative to the docking station 20, and return to the docking station 20, along at least a portion of the perimeter wire 26.

Figure 2:
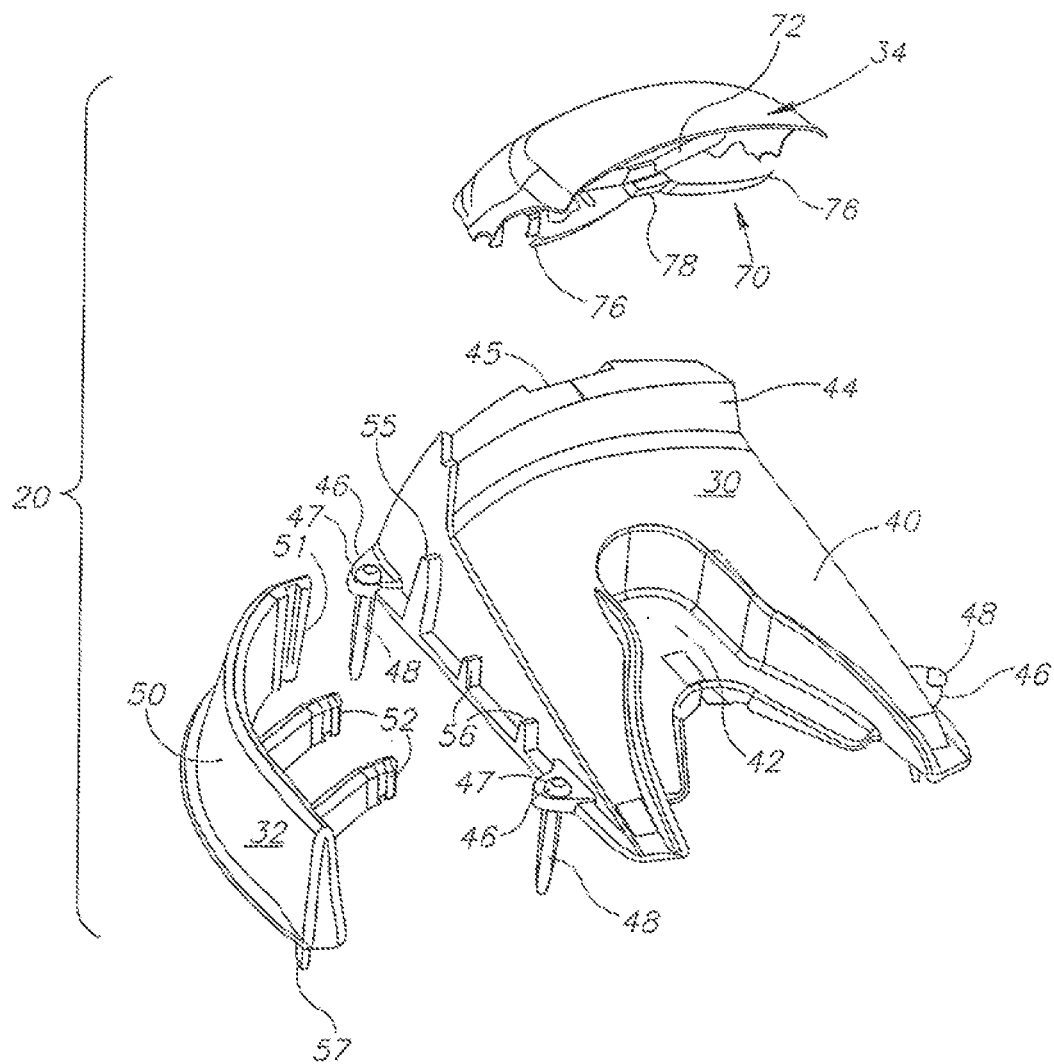
FIG. 2 is an exploded view of the docking station of FIG. 1.

FIG. 2 shows an exploded view of the docking station 20. The docking station 20 may be, for example, formed from a base 30, a fence 32 and a top 34. The base 30, fence 32 and top 34 are typically plastic pieces that are snap fit together, but can also be joined by mechanical and chemical fasteners and fastening techniques (either alone, or partially or fully with the snap fit).

The base 30, includes an inclined portion 40, with a valley 42 therein. The inclined portion 40 is at an incline that allows the robot 22, when traveling forward during docking, to slow down (as detailed below). The valley 42 receives and accommodates the front wheel 110 of the robot 22, and coupled with the incline, is of a depth such that the front wheel 110 of the robot 22 drops into the valley 42 (known as a "drop down event"), whereby the wheel drop is detected by the control system 104 of the robot 22, and the drive system 151 shuts off, allowing the robot 22 to slow down and dock, as detailed below.

The base 30 also includes a protruding portion 44, that serves as a stop for forward motion of the robot 22, limiting its forward travel. The protruding portion 44 may be of a rounded contour, similar to the contour of the front of the robot 22. The protruding portion 44 includes a cut out 45, for accommodating the control board 60 held by the top 34, that fits over the outside of the inclined portion 40 and the protruding portion 44 (as detailed below). Tabs 46, with openings 47 therein, extend from the inclined portion 40, and allow the passage of spikes 48 therethrough, to anchor the docking station 20 in the ground (as shown in FIG. 1).

The fence 32 serves to prevent the robot 22 from climbing in an incorrect direction during docking. It is typically of a body 50 of rounded contour, corresponding to the sides of the robot 22, to keep the robot 22 in a proper alignment during docking. The fence includes an edge 51 and posts 52, that are frictionally fitted over correspondingly shaped members 55 and 56 on the base 30 (with additional securement from mechanical or chemical fasteners also permissible). There may also be spikes 57, extending from the body 50, for anchorage and traction in the ground, to further secure the docking station 20 in place. In alternate embodiments, the fence 32 may be adjustable or slidably adjustable with respect to the base 30, so that it can be adjusted and set depending on the dimensions of the robot 22.

Figure 3:
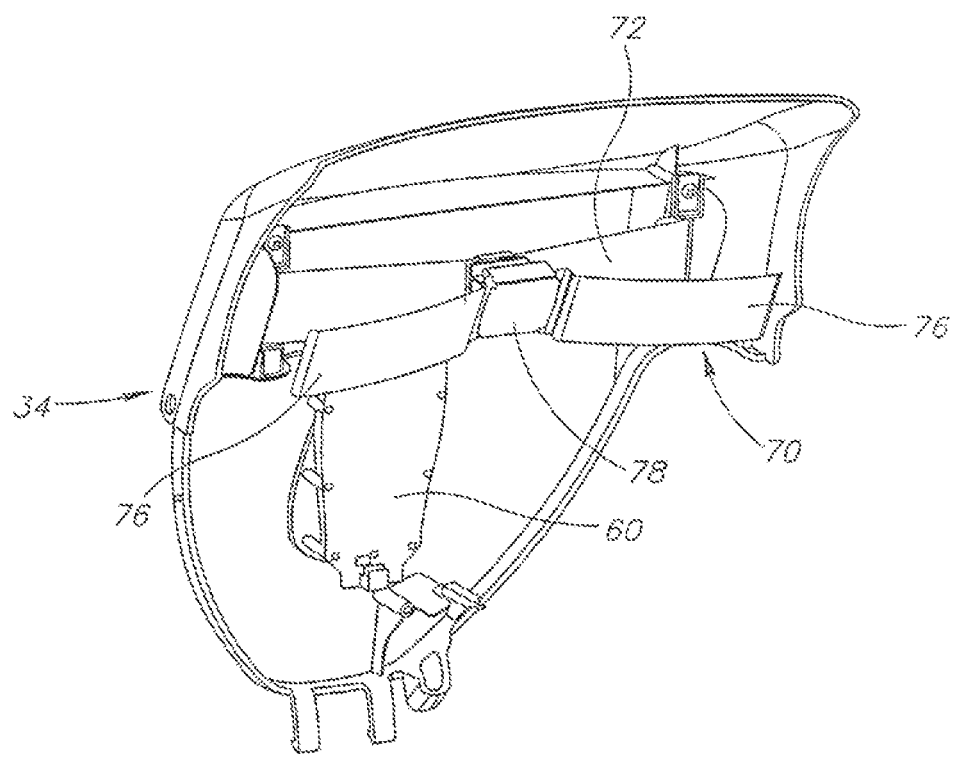
FIG. 3 is a perspective view of the top of the docking station of FIG. 1.
Figure 4:
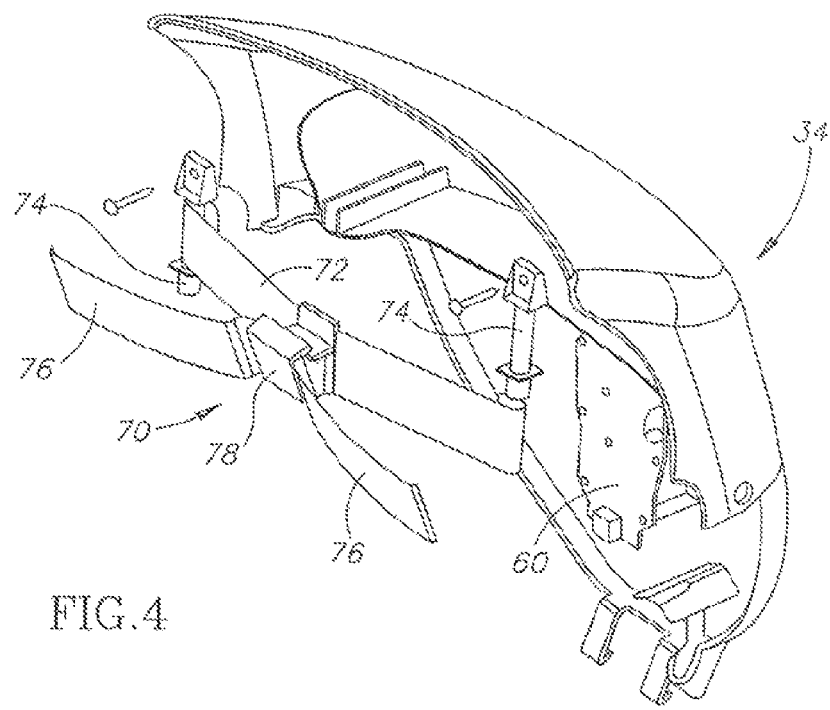
FIG. 4 is an exploded view of the top of the docking station.

Turning also to FIGS. 3 and 4, the top 34 fits over the outside of the base 30. The base 30 and top 34 fit together, such that there is a space between the base 30 and the top 34, that coupled with the cut out 45 in the base 30, provides room for accommodating the control board 60. The control board 60 accommodates the control system 62 (FIG. 5), detailed below. The space also accommodates a power supply 64. This power supply 64 may be connected to an external source of power, such as an electrical outlet, via a cord or the like, or a battery, for example, of 30 Volts.

Figure 6:
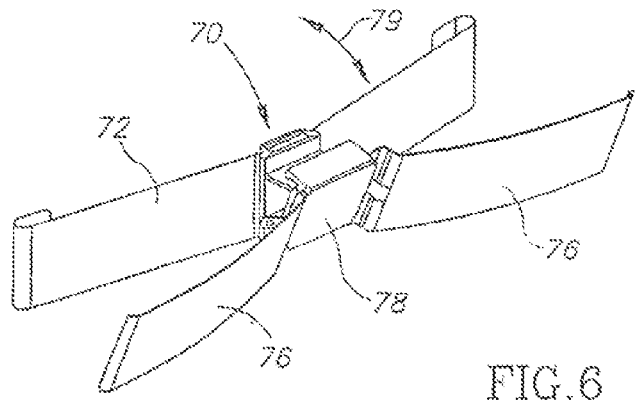
FIG. 6 is a perspective view of the contact unit of the docking station.

The power supply 64, typically via the charging unit 66 of the control system 62, on the control board 60, is electronically coupled to a contact unit 70. Turning also to FIG. 6, the contact unit 70 is for contact with the docking contacts 102 of the robot 22, for the various docking operations, as detailed below.

The contact unit 70 typically extends laterally from the top 34 of the docking station 20 (to receive the docking contacts 102 of the robot 22, typically in at least a substantially horizontal orientation, with respect to the horizontal or ground surface). The contact unit 70 is formed of a spring 72, typically of electrically conductive metal or other similar material, attached to the top 34 by pivots 74. For example, the spring 72 may be made of stainless steel. The contact unit 70, and portions thereof, function as a transmission part for transmitting energy, signals and the like from the docking station 20. The top 34 is typically angled slightly downward (in its normal orientation), to accommodate the angle of the incline of the base 30. This allows for a horizontally oriented docking between the docking contacts 102 of the robot 22 and the contact arms 76 of the contact unit 70.

Contact arms (or leafs) 76 are electronically coupled to the spring 72, through a suspension mounting member 78. The suspension mounting member 78 can swivel, as per the double headed arrow 79, with the contact arms 76 being able to move accordingly. The contact arms 76 extend from the suspension mounting member 78. The contact arms 76 are, for example, made from an electrically conductive metal that is spring like when in the form of a leaf, and magnetic. For example, the contact arms 76 may be made of materials such as 304 Stainless Steel, that is paramagnetic.

The control system 62 also includes a perimeter signal unit 80, that, for example, is located on the control board 60. The perimeter signal unit 80 is typically electrically coupled to the perimeter wire 26, and it transmits the aforementioned perimeter signal through the perimeter wire 26. The perimeter signal unit 80 may be, for example, an independent battery operated unit. While it is normally controlled automatically, as detailed below, it may also have a manual switch, that can be turned on and off manually by an operator (either a physical switch or via a remote controller). There is also an auxiliary unit 82 for sending and receiving other signals, such as triggering signals, as detailed below.

In the control system 62, the charging unit 66, the perimeter signal unit 80, and the auxiliary unit 82 may be processor, and, for example, microprocessor, based. While at least one method of connections and links between the power supply 64, charging unit 66, contact unit 70, perimeter signal unit 80, and auxiliary unit 82 has been disclosed and shown, numerous combinations of connections and links between the aforementioned components are permissible, provided they perform the operations detailed herein.

The control system 62 is in electronic communication with an external trigger 84. The external trigger typically resides on the control board. The external trigger 84 may be linked by wired, wireless or combinations thereof, links to external computers, controllers, systems, such as irrigation and sprinkler systems, timers, and the like.

Turning to FIGS. 7-10, the robot 22 suitable for use with the docking station 20 is, for example, a robotic lawn mower. For example, the robot 22 may be that disclosed in commonly owned U.S. Pat. No. 6,255,793, U.S. Pat. No. 6,443,509, U.S. Pat. No. 6,493,613 and Patent Cooperation Treaty Publication No. WO 01/70009 (PCT/IL01/00253). U.S. Pat. No. 6,255,793, U.S. Pat. No. 6,443,509, U.S. Pat. No. 6,493,613 and Patent Cooperation Treaty Publication No. WO 01/70009 (PCT/IL01/00253) are incorporated by reference herein. The robot 22 may also be Robotic Lawnmower Model Numbers RL 500, RL 550, RL 800 and RL 850, from Friendly Robotics (the trading name of the owner of this application) of Pardesiya, Israel. All of the aforementioned robots are modified with docking contacts 102, electronically linked (by wired, wireless links, or combinations thereof), to a control system, the control system suitably modified to be identical or similar to the control system 104 for the robot 22.

Figure 7:
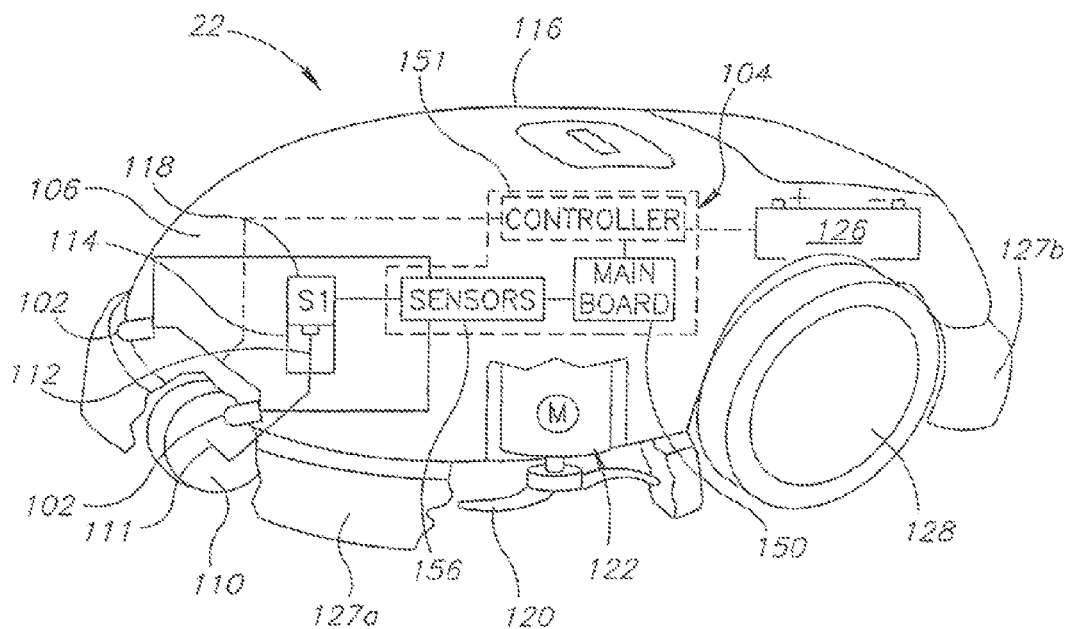
FIG. 7 is a perspective view of a robot in accordance with an embodiment of the invention, with a partial schematic diagram of control system components.
Figure 8:
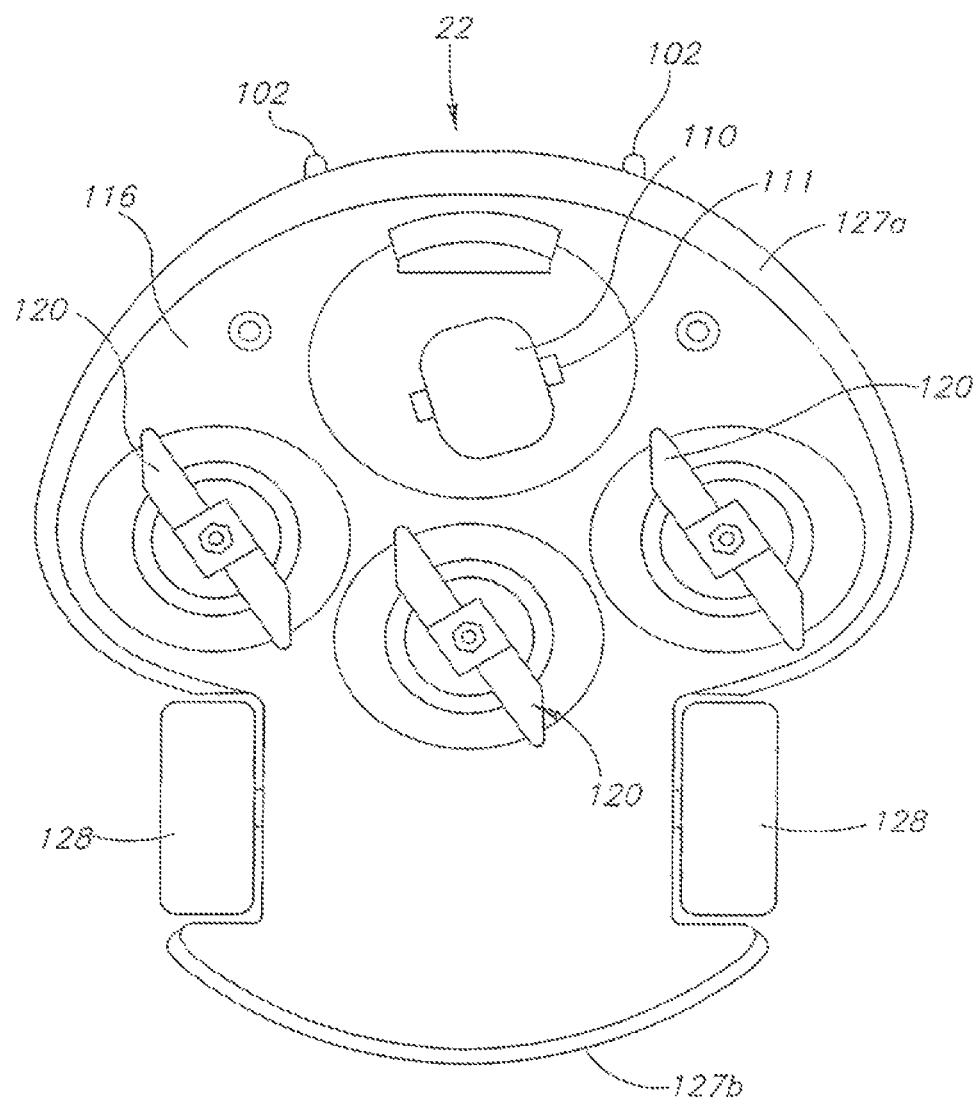
FIG. 8 is a bottom view of the robot of FIG. 7.

As the robot 22 may have many variations, FIGS. 7-10 detail an exemplary robot, suitable for use with the docking station 20. In FIGS. 7 and 8, the robot 22 includes docking contacts 102 (transmission parts for the transmission of energy, electricity, signals, or the like), extending forward or laterally from the front side 106 of the robot 22. The docking contacts 102 are typically parallel to the horizontal or ground surface.

There are typically two docking contacts 102, at the front (or front end) of the robot 22, electronically linked (e.g., connected or coupled, as shown in broken lines) to the control system 104 of the robot 22, and the power supply 126 (batteries and associated components). This electrical linkage allows for charging of the power system (not shown) once a sufficient contact is made (as determined by the control system 104, for example, there is at least a threshold voltage of, for example, at least 25 Volts, on the docking contacts 102), and there is docking between the robot 22 and the docking station 20, as shown, for example, in FIGS. 13 and 14.

The front wheel 110, whose axle 111 extends into a vertical rod section 112, is slidably mounted in a vertical orientation in a well 114 in the body 116 of the robot 22. Within the well 114 is a sensor (S1) 118, that detects wheel 110 position by detecting the position of the vertical rod section 112. The sensor (S1) 118 may be an electrical contact sensor, ultrasonic or light sensor, or any other position detecting sensor. The front wheel 110 of the robot 22, being slideably mounted in a vertical orientation, is such that when the axle 111/rod section 112, on which the front wheel 110 is mounted, slides or drops downward to a predetermined level (also caused by lifting the body of the robot 20 at its front end), the rod section 112 is out of contact with the sensor (S1) 118, linked to the control system 104 (FIG. 10). As a result, the requisite components of the control system 104 signal the drive system or movement system 151 (FIG. 10) to stop movement of the robot 22.

The robot 22 also includes cutting blades 120 driven by motors (M) 122. It also includes a power supply 126, for example, a battery, and front 127a and rear 127b bumpers, that if depressed, will stop the drive system 151, as detailed in U.S. Pat. No. 6,443,509. The front wheel 110 is passive (and typically has 360° movement), and the drive system 151 and navigation system 150 control the rear wheels 128, to move and steer the robot 22.

Figure 9:
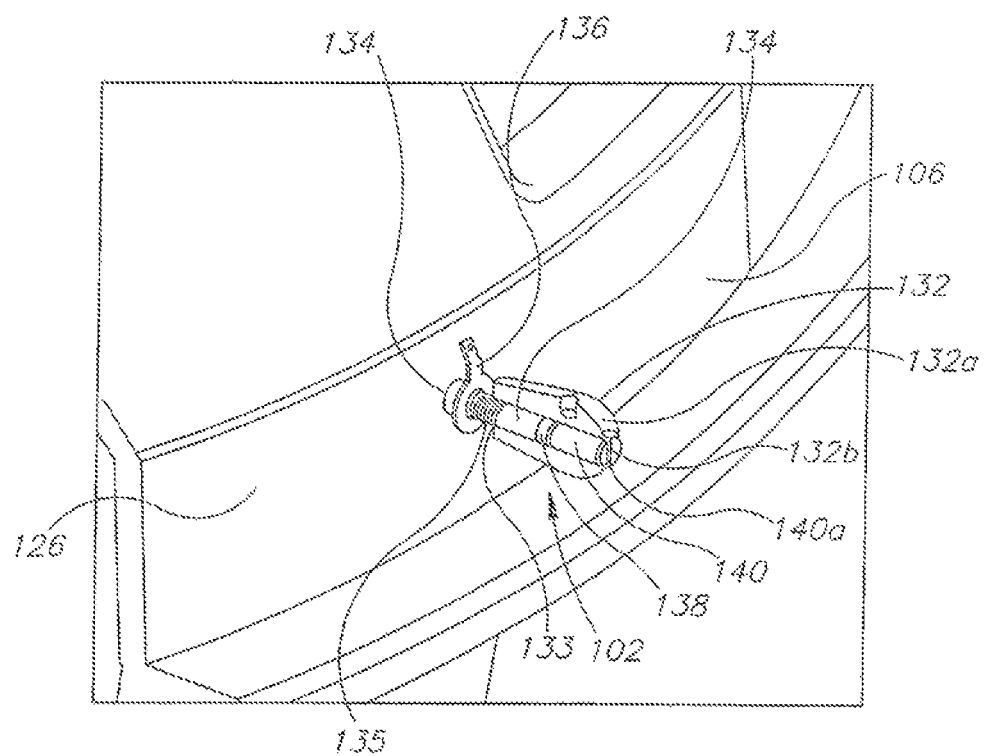
FIG. 9 is a cross-sectional view of a docking contact, representative of all docking contacts, on the robot.

Turning also to FIG. 9, the docking contacts 102 are shown in detail. These docking contacts 102 protrude from the body 116 of the robot 22. Each docking contact 102 is formed from a hollow shell 132, for example, of stainless steel. The shell 132 includes a rounded tip 132a and a tap opening 133. The tap opening 133 is received on a screw 134 (by threads 135), the screw 134 of an electrically conductive material. A cable tie 136 is in electrical contact with the screw 134, and the cable tie 136 receives a TAB connector (not shown), that electrically couples the contact 102 to the electronics of the control system 104 (and also the contacts 102 to the power supply 126).

An elastomeric member 138 is received by the screw 134, and this elastomeric member 138 contacts a magnetic rod 140. The elastomeric member 138 allows the screw 134 to push the magnetic rod 140 (forward, toward the tip of the inner wall 132b of the shell 132), to compensate for and maintain tight tolerances with the shell 132. The magnetic rod 140 is made of, for example, neodymium, and it extends inside the shell 132, and its edge surface 140a is typically in abutment with the tip inner wall portion 132b of the shell 132. Alternately, the magnetic rod 140 may be joined to the shell 132. The shell 132, screw 134, cable tie 136 and TAB connector form an electrically conductive path, that is electrically coupled to the control system 104 and ultimately, the power supply 126 of the robot 22 (an exemplary electrically conductive path shown in broken lines with an abbreviated control system 104 in FIG. 7), such that the robot can be recharged at the docking station 20 through the docking contacts 102.

The control system 104 for the robot 22 is fully shown in FIG. 10, to which reference is now made. FIG. 10 is a schematic diagram showing the relationship of the components, but each of the components may be electrically linked or coupled to any other component, as would be known, for proper operation of the robot 22.

Turning back to FIG. 7, as well, the control system 104 includes a main board 150, that may include the navigation system 150 (the navigation system may also be separate from the main board 150). The navigation system 150 works cooperatively with the drive system 151 (that controls the rear wheels 28 of the robot 22), to move the robot 22 along a desired course for its desired operation. The main board 150 is typically processor, and, for example, microprocessor based. A controller 152 for the robot 22 is electrically coupled to the main board 150. The motors (M) 122, power supply 126, drive system 151, and the various sensors described herein, represented by SENSORS 156, are also electrically coupled to the main board 150.

The docking contacts 102, the front wheel sensor (S1) 118, and various signal transmitters and receivers (the actual signals detailed below), represented by SIGNALS 158, also electrically couple to the SENSORS 156. For example, the docking contacts 102 activate upon the detection of a predetermined voltage, for example, approximately 25 volts, as detailed below. The docking contacts 102 are also electrically coupled to the power supply 126, either directly, or through the main board 150, controller 152, or both, in order to provide recharging of the power supply 126, when the robot 22 is docked in the docking station 20.

Sensors, for example, voltage sensors on the docking contacts 162, are also electrically coupled to the SENSORS 156. There are also boundary and perimeter signal detection sensors 166, that are electrically coupled to the SENSORS 156. These sensors 166 typically include coil sensors to detect electromagnetic signals, for example, the perimeter signal emitted by the perimeter wire 26.

Figure 11:
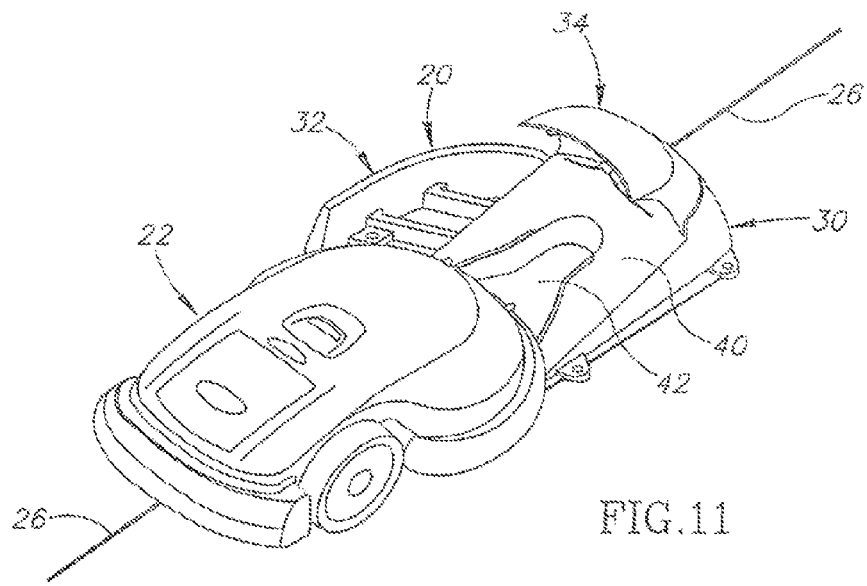
FIGS. 11-13 are perspective views detailing movement of the robot during a docking operation.

An example docking operation will now be described by referring to FIGS. 11-14, with reference also to FIGS. 1-10 where appropriate. Initially, as shown in FIG. 11, the robot 22, traveling along the perimeter wire 26, moves into the docking station 20. The robot 22 begins to move up the inclined portion 40 of the base 30.

Figure 12:
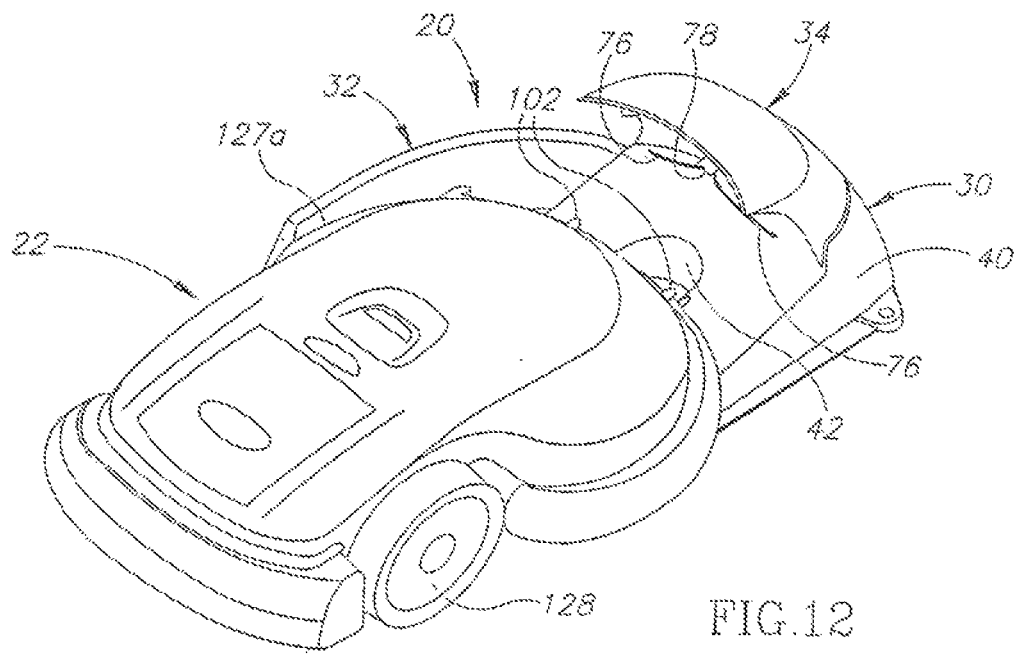

The robot 22 continues to move forward in the docking station 20, with its front wheel 110 firmly in the valley 42 of the base 30, as shown in FIG. 12. The robot 22 is positioned such that its outer contour, along its side, is within the fence 32 of the docking station 20. The robot 22 continues to move forward and upward on the incline, as driven by the rear wheels 128.

Figure 13:
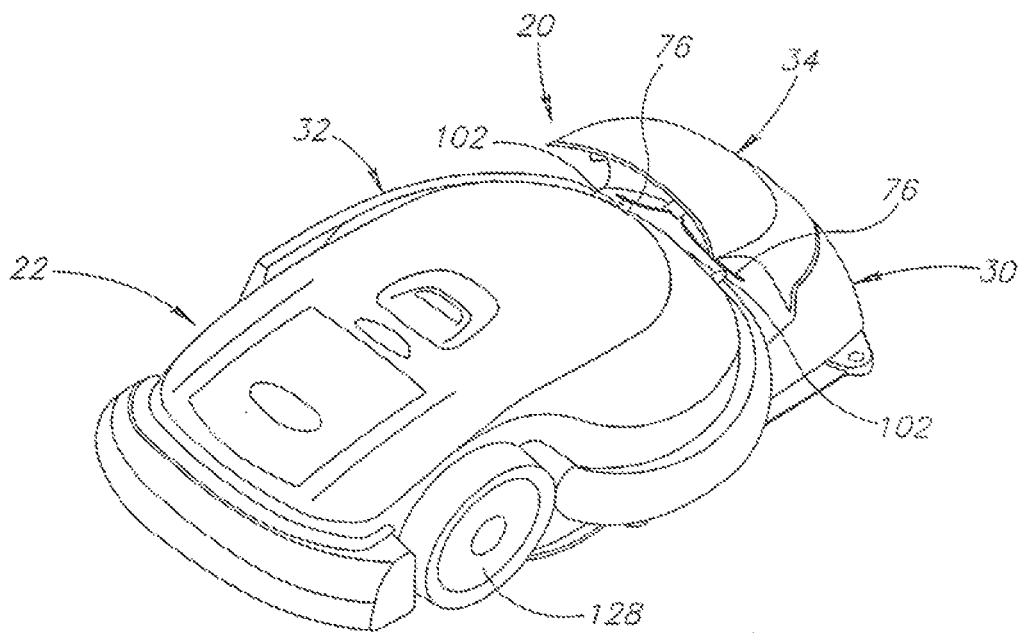

As shown in FIG. 13, detection of docking is initiated upon a "drop down event", that occurs when the unit or robot 22 climbs the base 30 of the docking station 20. The climbing causes the front wheel 110, to drop downward, this dropping detected by the control system 104 of the robot 22, receiving a signal from the sensor (S1) 118. The control system 22 then signals the drive system or movement system 151 to slow (and ultimately stop) the movement of the robot 22. The robot 22 slows down and either a docking contact is made, or there is a bumper event. When there is a docking contact or bumper event, this is detected by the control system 104 of the robot 22, that signals the drive (movement) 151 system to stop.

If the robot 22 is in a proper orientation in the docking station 20 for docking, then the docking contacts 102 on the robot 22 are aligned and in proximity with the contact arms 76 of the docking station 20. Docking is conducted with the robot 22 oriented horizontally with respect to the docking station 20 (in particular, the contact unit 70 of the docking station 20). The resulting docking engagement, of the robot 22 in the docking station 20, is horizontal (as the docking contacts 102 on the robot 22 are in physical and electrical contact with the respective contact arms 76 of the contact unit 70 of the docking station 20).

The docking contacts 102 on the robot 22 are moved into close proximity to the respective contact arms or leafs 76 of the docking station 20. The contact arms 76 are of sufficient flexibility, so as to be pulled by the magnetic rod 140 in the docking contact 102. This creates a rapid and firm contact between the shells 132 and the contact arms 76, shortening the time of semi-contact, if the contact arms or leafs 76 are wet or dirty. This substantially inhibits corrosion, dirt and other particulates from building on the contact arms 76 (on a bad, wet contact, some current flows through the water and rapidly extracts salts from the water, thus creating a non-conductive layer on the contacts that looks like corrosion). The magnetic rod 140 is of a magnetic strength sufficient to maintain proper electrical and physical contact between the docking contacts 102 and the contact arms 76 of the contact unit 70, if the robot 22 slips back slightly while docking at the docking station 20.

Figure 14:
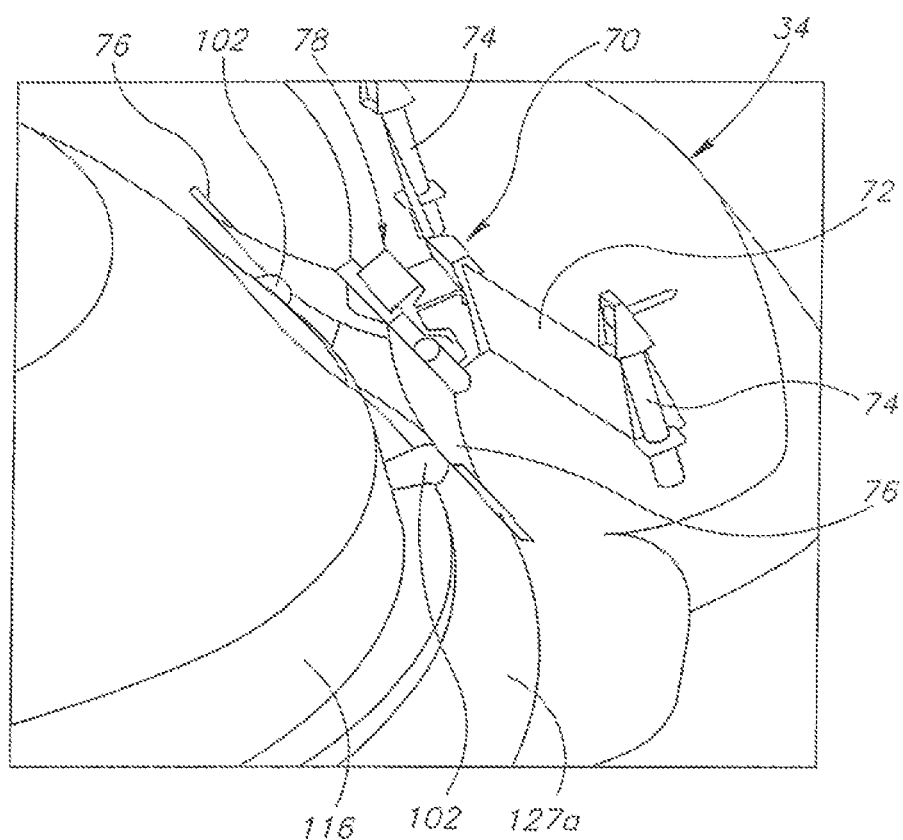
FIG. 14 is a detailed perspective view showing the docking mechanisms when the robot docked is docked in the docking station.

In a docking contact, as shown in detail in FIG. 14, the docking contacts 102 are in contact with the contact arms 76 of the docking station 20, such that at least a threshold voltage (for example, at least 25 Volts) is then detected by the control system 104 of the robot 22, via the docking contacts sensors 162 (FIG. 10), activating the docking contacts 102. If this threshold voltage is not detected, there will be a bumper event (programmed into the control system 104).

The bumper event is such that the robot 22 backs away from the docking station 20 and attempts to redock. The movements for the robot 22 for this redocking are programmed into the control system 104, such that the drive system 151 can move the robot 22, as is necessary for another docking attempt. If the docking attempt is successful, docking is in accordance with the remainder of the process detailed below. Otherwise, bumper events can continue for as long as desired, with the number of redocking attempts (bumper events) typically preprogrammed into the control system 104 of the robot 22.

Returning to docking of FIGS. 13 and 14, the docking contacts 102 are activated by the charging voltage of the control system 62 of the docking station 20, only when they sense (detect) a voltage (when the docking contacts 102 of the robot 22 touch the contact arms 76) of at least the threshold voltage (for example, at least 25 Volts). This prevents accidental shortening of the contact arms 76, if the robot 22 is not docked.

In the docking station 20, the perimeter signal, provided by the perimeter signal unit 80, is turned off whenever the robot 22 docks. The turning on and off of the perimeter signal, via the perimeter signal unit 80, is typically controlled by the control system 62 of the docking station 20.

The perimeter signal is turned on once a signal from the robot 22 is detected (emitted through the SIGNALS 158 component of the control system 104 and received in the docking station 20 through the contact with the contact arms 76). This signal is based on turning on and off the charging switch (not shown) of the robot 22. The charging switch is, for example, in the main board 150 of the control system 104 on the robot 22, and at a certain frequency, to draw alternating current from the control board 60 of the control system 62 of the docking station 20 (the control board 60 monitors the charging current).

It is also possible to turn on and off the perimeter signal manually, through a switch (not shown) on the control board 60 of the docking station 20. The control system 62 of the docking station 20 can also be programmed to automatically control the perimeter signal unit 80, activating and deactivating (turning ON and OFF) the perimeter signal.

Once docked, the power supply 126 of the robot 22 is recharged (energy or power is transferred from the power source (e.g. power supply 64) of the docking station 20 to the power supply 126 of the robot 22). Once the power supply 126 is recharged (to a predetermined level, typically a predetermined voltage), as detected by the controller 152 of the control system 104, the robot 22 can leave the docking station 20 for further operations.

The robot 22 can be set to resume operation (or begin operation) from the docking station 22 upon a triggering signal, typically recognized by the control system 104 of the robot. This triggering signal can be timed in the control system 104 of the robot 22, manually sent to or activated on the robot 22. This triggering signal can also be programmed into the control system 62 of the docking station 20, typically in the auxiliary signal unit 82, or manually sent to or activated on the docking station 20. The docking station 20, through the auxiliary signal unit 82, would then send a signal (triggering signal) to the robot 22 (through the contact arms 76 in contact with the docking contacts 102) for the robot 22 starting up and leaving the docking station 20 to resume operation. The activation of this triggering signal, typically also turns on the perimeter signal, by the perimeter signal unit 80.

Activation of the triggering signal can be at any desired time, for example, when mowing is desired. This can be at daily, weekly or even monthly intervals, depending on the kind of mowing needed and the season of the year.

There is also an external trigger 84 (for example, on the control board 60) electronically coupled to control unit 62 of the docking station 20, that will initiate robot operation. The robot operation is initiated by sending a signal through the control unit 62 of the docking station 20 (via the contact arms 76) to the control system 104 of the robot 22, through the docking contacts 102 (in contact with the contact arms 76). This trigger can be coupled to an irrigation computer, of a standard irrigation system, such as that for yards, courtyards, gardens, etc. One (or more) of the irrigation taps or ports (whose activation is typically timed, controlled by a timer or the like) can be set for the robot, and its activation will result in activation (initiation) of the robot 22 for mowing.

Accordingly, the scheduling of mowing can be set as one of the taps and programmed together with the irrigation schedule for the yard, courtyard, garden or the like. Scheduling for the activation of the triggering signal can be at any desired time (for example, predetermined interval), for example, when mowing is desired. This can be at daily, weekly or even monthly intervals, depending on the kind of mowing needed and the season of the year.

While the robot 22 has been shown as a robotic lawnmower, the docking station 20 can be easily modified to be used with robots that have numerous other functions. These robots include robotic vacuum cleaners, robotic floor sweepers, robotic snow removers, robotic leaf collectors and blowers, and the like.

There has been shown and described at least one preferred embodiment of a docking station and robot for use therewith. It is apparent to those skilled in the art, however, that many changes, variations, modifications, and other uses and applications for the apparatus and its components are possible, and also, that such changes, variations, modifications, and other uses and applications which do not depart from the spirit and scope of the invention are deemed to be covered by the invention, which is limited only by the claims which follow.

What is claimed is:

1. A robot comprising:
a movement system for moving the robot over a surface;
a power supply for the robot, adapted to be electrically charged and for supplying electrical power to the movement system;
at least one magnetic contact extending from the robot, the at least one magnetic contact being electrically conductive for receiving and conducting electricity through the at least one magnetic contact for the power supply;
a control system in communication with the at least one magnetic contact;
the power supply in communication with the control system and in electrical communication with the at least one magnetic contact, and, the control system is configured for permitting charging of the power supply through the at least one magnetic contact; and,
the at least one magnetic contact of a magnetic strength for: 1) bringing the robot into a magnetic engagement including both a physical contact and an electrical contact with an electrically conductive portion of a charger for charging the power supply, the magnetic engagement through which the power supply of the robot is charged, and, 2) maintaining the magnetic engagement at least during the charging of the power supply.

2. The robot of claim 1, wherein the at least one magnetic contact extends laterally from the robot.

3. The robot of claim 2, wherein the control system is configured for permitting charging of the power supply through the at least one magnetic contact, when at least a threshold voltage of approximately 25 volts is detected on the at least one magnetic contact.

4. The robot of claim 2, wherein the at least one magnetic contact includes two magnetic contacts.

5. The robot of claim 4, wherein the control system is configured for permitting charging of the power supply through the magnetic contacts when a predetermined voltage on the magnetic contacts is detected.

6. The robot of claim 1, wherein the movement system includes a first wheel on a slidably mounted mechanism, the slidably mounted mechanism configured such that when the first wheel drops a predetermined distance, the control system slows movement of the robot.

7. The robot of claim 1, wherein the movement system includes a first wheel on a slidably mounted mechanism, the slidably mounted mechanism configured such that when the first wheel drops a predetermined distance, the control system stops movement of the robot.

8. A docking station comprising: a portion configured for receiving a robot; a receptor mechanism coupled to the robot receiving portion for receiving at least one magnetic docking contact extending from the robot, the at least one magnetic docking contact being electrically conductive; a system for providing electricity to the robot for charging at least one power supply of the robot through the at least one magnetic docking contact, the system coupled to the receptor mechanism; and, the receptor mechanism being magnetic and configured for conducting electricity, and for magnetically and electrically contacting the at least one magnetic docking contact of the robot and transmitting electricity therethrough, and the receptor mechanism for bringing the robot into a magnetic engagement through which the docking station charges the at least one power supply of the robot, and, the magnetic engagement including both a physical contact and an electrical contact between the receptor mechanism and the at least one magnetic docking contact of the robot.

9. The docking station of claim 8, wherein the receptor mechanism is configured for contacting two magnetic docking contacts on the robot.

10. The docking, station of claim 9, wherein the receptor mechanism includes oppositely disposed contact arms, each of the contact arms configured for electrical contact with each of the magnetic docking contacts of the robot.

11. The docking station of claim 10, wherein system for providing energy provides electricity to the contact arms at a predetermined voltage.

12. The docking station of claim 11, wherein the predetermined voltage is a voltage that causes the control system of a robot to recognize docking between the robot and the docking station to initiate charging of the robot.

13. The docking station of claim 9, wherein the receptor mechanism includes oppositely disposed contact arms, each of the contact arms configured for magnetic contact with each of the magnetic docking contacts of the robot.

14. The docking station of claim 8, additionally comprising: a control system in communication with the energy providing system, the control system configured for communication with at least one tap of an irrigation system, and the control system is coupled with the receptor mechanism and the at least one tap configured for sending a signal to the control system for activating a robot docked in the docking station, the control system sending a corresponding signal for activating the robot through the receptor mechanism and the at least one magnetic docking contact.

15. The docking station of claim 14, wherein the control system includes a perimeter signal unit for placing a signal in at least one segment of a wire electrically coupled to the perimeter signal unit.

16. The docking station of claim 15, wherein the perimeter signal unit emits an electromagnetic signal.

17. The docking station of claim 8, wherein the portion configured for receiving a robot includes an inclined section and a valley at least partially within the inclined section, the valley configured for accommodating at least one wheel of a robot and the inclined section of a height such that the at least one wheel of the robot can drop a predetermined distance, such that control system of the robot stops movement of the robot.

18. A docking station comprising: a portion configured for receiving a robot; a receptor mechanism coupled to the robot receiving portion; and a controller for coupling with at least one tap of an irrigation system, and the controller is coupled to the receptor mechanism, the receptor mechanism configured for being in at least electrical contact with at least one magnetic and electrically conductive docking contact extending from the robot, when the robot is docked in the docking station, and the controller, upon receiving a signal from the at last one tap, is configured for sending a signal to a robot docked in the docking station, through the receptor mechanism, for electrical transmission through the at least one magnetic docking contact, for initiating operation of the robot.

19. The docking station of claim 18, wherein the controller is configured for sending a signal to the robot docked in the docking station for initiating operation of the robot at predetermined intervals.

20. The docking station of claim 19, additionally comprising: a system for providing electricity to a robot for charging at least one power supply of the robot, the system for providing electricity in communication with the receptor mechanism, and for providing electricity to the robot when the at least one magnetic docking contact of the robot is in contact with the receptor mechanism.

21. The docking station of claim 19, wherein the at least one magnetic docking contact on the robot includes at least two magnetic docking contacts on the robot in contact with the receptor mechanism.

22. The docking station of claim 21, wherein the receptor mechanism includes oppositely disposed contact arms, each of the contact arms configured for electrical contact with each of the magnetic docking contacts of the robot.

23. The docking station of claim 22, wherein system for providing energy provides electricity to the contact arms at a predetermined voltage sufficient to cause the control system of a robot to recognize docking between the robot and the docking station to initiate charging of the robot.

24. The docking station of claim 21, wherein the receptor mechanism includes oppositely disposed contact arms, each of the contact arms configured for magnetic contact with each of the magnetic docking contacts of the robot.

25. The docking station of claim 18, wherein the portion configured for receiving a robot includes an inclined section and a valley at least partially within the inclined section, the valley configured for accommodating at least one wheel of a robot and the inclined section of a height such that the at least one wheel of the robot can drop a predetermined distance, such that control system of the robot slows movement of the robot.

26. The docking station of claim 18, wherein the portion configured for receiving a robot includes an inclined section and a valley at least partially within the inclined section, the valley configured for accommodating at least one wheel of a robot and the inclined section of a height such that the at least one wheel of the robot can drop a predetermined distance, such that control system of the robot stops movement of the robot.

27. A robot comprising: a movement system for moving the robot over a surface; a power supply adapted to be electrically charged and for supplying electrical power to the movement system; and at least one magnetic contact for communicating with a transmission part of a docking station, the at least one magnetic contact extending laterally from the robot and being magnetic and electrically conductive, and in electrical communication with the power supply of the robot, the at least one magnetic contact for facilitating magnetic and electrical communication with the transmission part, the magnetic contact through which the power supply of the robot is charged when the movement system moves the robot into a position for docking in the docking station, and, the magnetic contact providing forces for bringing the robot into a magnetic engagement with the transmission part of the docking station, the magnetic contact through which the docking station electrically charges the power supply of the robot, and, the magnetic engagement maintaining the docking position of the robot in the docking station when the power supply of the robot is being charged.

28. The robot of claim 27, wherein the at least one magnetic contact facilitates the passing of signals to the robot and the receipt of signals by the robot for controlling the robot.

29. The robot of claim 28, wherein the at least one magnetic contact includes two contacts.

30. The robot of claim 29, wherein the transmission part includes two oppositely disposed conductive arms, each of the arms being adapted for electrical and magnetic contact with at least one of the magnetic contacts of the robot.

\* \* \* \* \*